(12) United States Patent
Finney

(10) Patent No.: US 7,703,819 B2
(45) Date of Patent: Apr. 27, 2010

(54) PEDESTRIAN PROTECTION

(75) Inventor: Ian Antony Finney, West Midlands (GB)

(73) Assignee: Concept Mouldings Ltd., West Midlands (GB)

( * ) Notice: Subject to any disclaimer, the term of this patent is extended or adjusted under 35 U.S.C. 154(b) by 0 days.

(21) Appl. No.: 11/471,719

(22) Filed: Jun. 21, 2006

(65) Prior Publication Data

US 2007/0296235 A1 Dec. 27, 2007

(51) Int. Cl.
B60R 21/34 (2006.01)
B60R 19/02 (2006.01)

(52) U.S. Cl. .................. 293/102; 293/142; 293/115; 296/187.04

(58) Field of Classification Search ............ 296/187.04; 293/142–147, 115, 102; D12/171; 180/274
See application file for complete search history.

(56) References Cited

U.S. PATENT DOCUMENTS

| | | | | |
|---|---|---|---|---|
| 1,515,567 | A * | 11/1924 | Finnegan | 293/42 |
| 4,168,855 | A * | 9/1979 | Koch | 293/115 |
| 6,022,057 | A * | 2/2000 | Vermeulen | 293/132 |
| 6,682,111 | B1 * | 1/2004 | Houseman et al. | 293/115 |
| 6,755,459 | B2 * | 6/2004 | Thelen et al. | 296/187.04 |
| 2007/0200373 | A1 * | 8/2007 | Miller et al. | 293/102 |

FOREIGN PATENT DOCUMENTS

| | | |
|---|---|---|
| AT | 362 240 | 4/1981 |
| DE | 24 54 389 | 5/1976 |
| DE | 43 08 021 | 9/1994 |
| DE | 199 11 832 | 9/1999 |
| EP | 0 641 687 | 1/2001 |
| GB | 2 316 371 | 2/1998 |
| GB | 2 327 912 | 2/1999 |
| GB | 2 338 687 | 12/1999 |
| JP | 09315243 A * | 12/1997 |
| JP | 2001001848 A * | 1/2001 |
| JP | 2001001852 A * | 1/2001 |
| JP | 2004203255 A * | 7/2004 |

OTHER PUBLICATIONS

Paine, Michael, "Protecting Pedestrians by Vehicle Design", Mar. 2, 1999, printed from the Internet Dec. 1, 2008, http://users.tpg.com.au/users/mpaine/ppvd.html.*
Itoi, Hideyuki, "Plastics Offer Automotive Energy Absorbing Systems for Pedestrian Safety", Sep. 14, 2005, printed from the Internet Dec. 1, 2008, http://www.jobwerx.com/news/Archives/geam biz-id=947505 894.html.*

* cited by examiner

Primary Examiner—Jason S Morrow
(74) Attorney, Agent, or Firm—Nixon & Vanderhye P.C.

(57) ABSTRACT

A road vehicle 10A with a bonnet or engine compartment 14A and engine 32A is provided with pedestrian protection structure 42. This is formed by first assessing the structure of the vehicle 10A to determine the ability of the structure to provide at least partial absorption of a pre-defined impact to the vehicle (such as a simulated head or leg impact). The additional structure 42 is mounted on the vehicle 10A to provide partial absorption of the initial impact, at least sufficient for the vehicle structure to absorb any remaining energy of impact.

16 Claims, 6 Drawing Sheets

PEDESTRIAN PROTECTION

The present invention relates to pedestrian protection and in particular, but not exclusively, to the protection of pedestrians during collision with a road vehicle.

Various proposals have previously been made for protecting pedestrians during collisions with a vehicle. These include the present applicant's proposals set out in previous patents GB 2327912, GB 2338687 and GB 2316371.

The present invention provides a method of providing pedestrian protection for a road vehicle, in which the structure of the vehicle is assessed to determine the ability of the structure to provide at least partial absorption of a pre-defined impact to the vehicle, and in which an additional impact absorbing structure is provided for mounting on the vehicle to provide initial and at least partial absorption of the pre-defined impact prior to impact on said vehicle structure, and in which the additional structure is so selected or designed that the aggregate of the impact absorption provided, in use, by the additional structure and by said vehicle structure is at least sufficient to absorb the pre-defined impact.

The pre-defined impact is preferably from the front of the vehicle. The pre-defined impact may be to the bonnet. The pre-defined impact may be to the bonnet leading edge. The pre-defined impact may be a simulated impact of a child or adult head or of an upper leg.

Alternatively, the pre-defined impact may be in the bumper region of the vehicle. The additional structure may be a bumper. The pre-defined impact may be a simulated leg impact. The additional structure may further incorporate an upward extension from the bumper, in front of the vehicle. The said vehicle structure may be behind the bumper or upward extension. The bumper and the upward extension may be integrally formed. The bumper and the upward extension are preferably mounted by means of bumper mountings on the vehicle. The upward extension preferably extends up to the level of the bonnet leading edge. The upward extension is preferably spaced forward of the bonnet leading edge.

The structure may comprise a hollow core member, which may be filled with energy absorbing foam. The hollow core member may further contain at least one metal reinforcing member. The hollow core member may be covered with resilient material.

The additional structure preferably provides, in use, initial and at least partial absorption at respective positions of respective pre-defined impacts, and is so selected or designed that the aggregate of the impact absorption of the said positions and of the said vehicle structure is at least sufficient to absorb either of the pre-defined impacts.

The invention also provides a pedestrian protection arrangement for use with a road vehicle which has a structure having an ability, in use, to provide at least partial absorption of a pre-defined impact, the arrangement comprising an additional impact absorbing structure mounted, in use, on the vehicle to provide initial and at least partial absorption of the pre-defined impact prior to impact on the said vehicle structure, the additional structure being so selected or designed that the aggregate of the impact absorption provided, in use, by the additional structure and by the said vehicle structure is at least sufficient to absorb the pre-defined impact.

The pre-defined impact is preferably from the front of the vehicle. The pre-defined impact may be to the bonnet. The pre-defined impact may be to the bonnet leading edge. The pre-defined impact may be a simulated impact of a child or adult head or of an upper leg.

Alternatively, the pre-defined impact may be in the bumper region of the vehicle. The additional structure may be a bumper. The pre-defined impact may be a simulated leg impact. The additional structure may further incorporate an upward extension from the bumper, in front of the vehicle. The said vehicle structure may be behind the bumper or upward extension. The bumper and the upward extension may be integrally formed. The bumper and the upward extension are preferably mounted by means of bumper mountings on the vehicle. The upward extension preferably extends up to the level of the bonnet leading edge. The upward extension is preferably spaced forward of the bonnet leading edge.

The structure may comprise a hollow core member, which may be filled with energy absorbing foam. The hollow core member may further contain at least one metal reinforcing member. The hollow core member may be covered with resilient material.

The additional structure preferably provides, in use, initial and at least partial absorption at respective positions of respective defined impacts, and is so selected or designed that the aggregate of the impact absorption of the said positions and the said vehicle structure is at least sufficient to absorb either of the pre-defined impacts.

The invention also provides a pedestrian protection arrangement for use with a road vehicle and comprising a bumper for mounting on the vehicle, and an upward extension from the bumper, extending in front of the vehicle, in use.

The road vehicle preferably has a structure having an ability, in use, to provide at least partial absorption of a pre-defined impact, the arrangement comprising an additional impact absorbing structure to provide initial and at least partial absorption of the pre-defined impact prior to impact on the said vehicle structure, and the additional structure being so selected or designed that the aggregate of the impact absorption provided, in use, by the additional structure and by the said vehicle structure is at least sufficient to absorb the pre-defined impact.

The pre-defined impact is preferably from the front of the vehicle. The pre-defined impact may be to the bonnet. The pre-defined impact may be to the bonnet leading edge. The pre-defined impact may be a simulated impact of a child or adult head.

Alternatively, the pre-defined impact may be in the bumper region of the vehicle. The pre-defined impact may be a simulated leg impact. The said vehicle structure may be behind the bumper or upward extension. The bumper and the upward extension may be integrally formed. The bumper and the upward extension are preferably mounted by means of bumper mountings on the vehicle. The upward extension preferably extends up to the level of the bonnet leading edge. The upward extension is preferably spaced forward of the bonnet leading edge.

The structure may comprise a hollow core member, which may be filled with energy absorbing foam. The hollow core member may further contain at least one metal reinforcing member. The hollow core member may be covered with resilient material.

The additional structure preferably provides, in use, initial and at least partial absorption at respective positions of respective pre-defined impacts, and is so selected or designed that the aggregate of the impact absorption of the said positions and the said vehicle structure is at least sufficient to absorb either of the pre-defined impacts.

The invention also provides a road vehicle having a structure able, in use, to provide at least partial absorption of a pre-defined impact, and an additional impact absorbing structure mounted on the vehicle to provide initial and at least partial absorption of the pre-defined impact prior to impact on the vehicle structure, and in which the additional structure is so selected or designed that the aggregate of the impact absorption provided, in use, by the additional structure and by the said vehicle structure is at least sufficient to absorb the pre-defined impact.

The pre-defined impact is preferably from the front of the vehicle. The pre-defined impact may be to the bonnet. The pre-defined impact may be to the bonnet leading edge. The pre-defined impact may be a simulated impact of an adult or child head.

Alternatively, the pre-defined impact may be in the bumper region of the vehicle. The additional structure may be a bumper. The pre-defined impact may be a simulated leg impact. The additional structure may further incorporate an upward extension from the bumper, in front of the vehicle. The said vehicle structure may be behind the bumper or upward extension. The bumper and the upward extension may be integrally formed. The bumper and the upward extension are preferably mounted by means of bumper mountings on the vehicle. The upward extension preferably extends up to the level of the bonnet leading edge. The upward extension is preferably spaced forward of the bonnet leading edge.

The structure may comprise a hollow core member, which may be filled with energy absorbing foam. The hollow core member may further contain at least one metal reinforcing member. The hollow core member may be covered with resilient material.

The additional structure preferably provides, in use, initial and at least partial absorption at respective positions of respective pre-defined impacts, and is so selected or designed that the aggregate of the impact absorption of the said positions and the said vehicle structure is at least sufficient to absorb either of the pre-defined impacts.

Examples of the present invention will now be described in more detail, by way of example only, and with reference to the accompanying drawings, in which.

Figure 1:
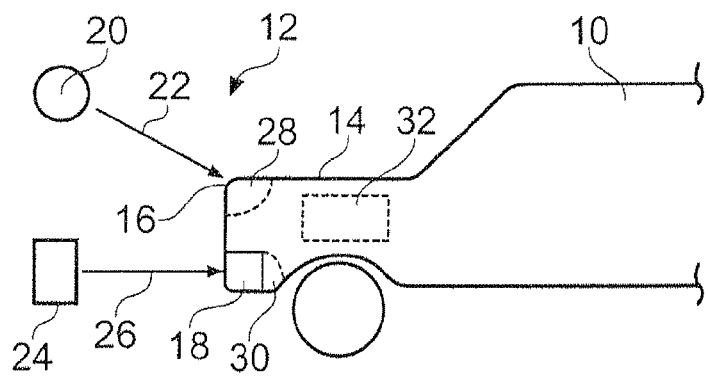
FIG. 1 is a schematic side view of the front of a vehicle.
Figure 2:
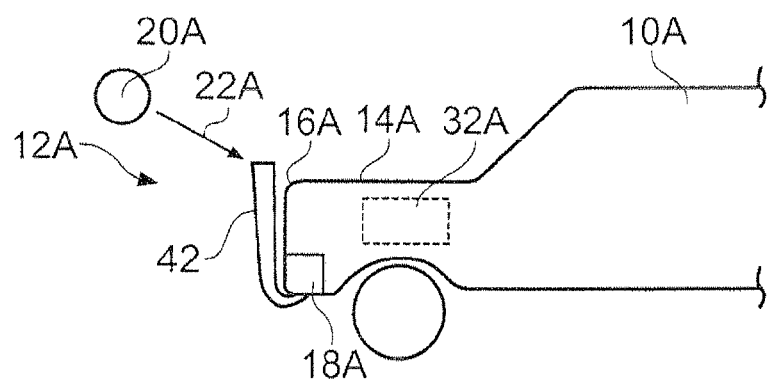
FIGS. 2, 3 and 4 are schematic side views of a vehicle protected in accordance with the invention, undergoing safety testing.
Figure 3:
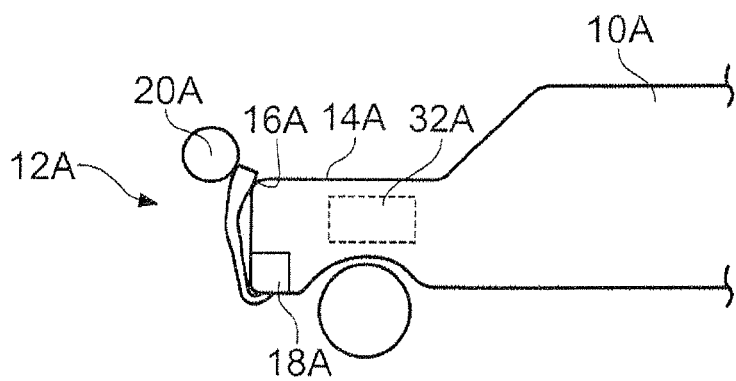
Figure 4:
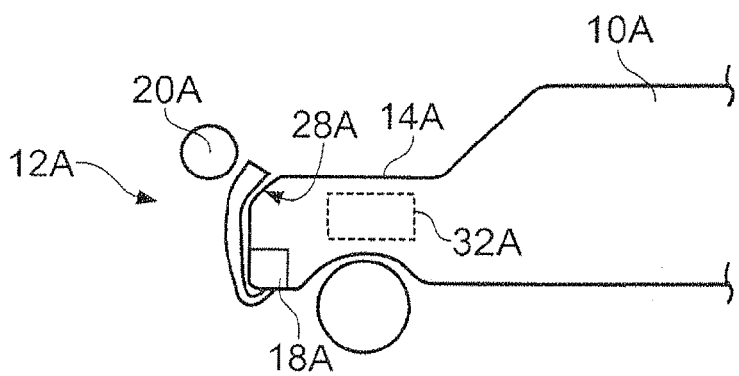

FIG. 1 shows a conventional road vehicle 10 having a front end generally at 12 and including, in this example, a bonnet or engine compartment 14, having a leading edge 16. A bumper 18 is also provided at the lower edge of the bonnet 14.

Modern safety legislation requires vehicles to be tested in various ways, including impact testing. Various pre-defined impacts are applied to the vehicle. Pre-defined minimum performances are required in order for the vehicle to pass the test. For example, a child head impact is simulated by projecting a ball 20 (known as a "head form") of known mass toward the bonnet 14, along a defined path 22. In one safety test, the ball 20 is required to impact on the leading edge 16. A larger ball is used to simulate an adult head impact.

In a different test to simulate the impact of an adult leg, a rectangular block 24 is projected toward the bumper 18 of the vehicle, along a path 26. The block 24 is sometimes known as a "leg form", and has pre-defined shape, mass and other physical characteristics.

In each test, the vehicle 10 is required to absorb the impact from the ball 20 or block 24, in a particular manner, which may include maximum allowable deceleration or reaction forces, maximum or minimum lengths over which the impact must be absorbed, or the like.

Accordingly, the vehicle 10 is caused to deform and crumple to some extent, during the impacts of the ball 20 and block 24. Crumpled areas 28, 30 are the result. Crumple zones have hitherto been designed for occupant safety, not to enhance pedestrian safety. (Crumple areas 28, 30 are both shown on the same vehicle 10 in FIG. 1, but it is to be realised that in normal testing, a single vehicle will be subjected only to one or other of the defined impacts, but the vehicle design must pass both tests in order to be approved.)

Safety legislation is becoming increasingly complex. Accordingly, it is becoming necessary to increase the size of the regions 18, 28, 30 in order to meet these increasing standards. However, the design of the vehicle 10 places an upper limit on the size of the regions 28, 30. For example, an engine block 32 will be encountered if one of the regions 28, 30 expands sufficiently back into the vehicle 10, but the engine block 32 will be incapable of deforming to help absorb impact.

Other problems in meeting higher safety standards may arise from particular features present in the conventional vehicle design. For example, the bonnet leading edge 16 may be relatively hard, because it is often formed of metal sheet folded to form the edge 16. In addition, catch or lock mechanisms are commonly provided along the leading edge 16 to hold the bonnet closed during normal use, and these structures may be bulky and hard, thus affecting the ability of the vehicle 10 to absorb by crumpling.

FIGS. 2 to 7 illustrate a vehicle 40, which has been provided with impact protection in accordance with the present invention. Many features correspond with features shown in FIG. 1, and are thus given the same reference numerals, with the suffix A.

The base vehicle 10A is identical to the vehicle 10, but carries an additional impact absorbing structure 42. The additional structure 42 is in the form of a protection bar mounted on the vehicle 10A in the region of the bumper 18A and standing up in front of the bonnet 14A and slightly above the leading edge 16A. The additional structure 42 is constructed in a manner which allows it to deform to absorb energy and impact. For example, when a head impact ball 20A is projected along a path 22A, the ball 20A first impacts the structure 42, near its upper extremity (see FIG. 2). This causes the structure 42 to bend (FIG. 3), thereby providing initial and at least partial absorption of the impact defined by the ball 20A and path 22A. In due course (FIG. 3) the structure 42 may deflect sufficiently to encounter the leading edge 16A. Consequently, subsequent deflection of the structure 42 also causes the bonnet 14A to crumple in a region 28A. Thus, further impact absorption takes place by crumpling of the bonnet 14A.

However, it will readily be understood from the above description that initial partial absorption of the defined impact, provided by the structure 42, results in the bonnet 14A being required to crumple only sufficiently to absorb the remaining energy, i.e. less than is required to absorb the entirety of the pre-defined impact in the absence of the structure 42. Consequently, the crumple region 28A will be smaller than the crumple region 28 of FIG. 1, for the same pre-defined impact.

In accordance with the invention, the additional structure 42 is selected or designed so that the aggregate of the impact absorption provided, in use, by the additional structure 42, and the absorption provided by the vehicle structure (in this case in the region of the bonnet 14), is at least sufficient to absorb the pre-defined impact. Thus, the vehicle 10A, having been provided with a structure 42 in accordance with the present invention, is able to absorb the pre-defined impact with a smaller crumple region 28A and thus, higher safety standards can be met without any re-design being required for the base vehicle 10A. It is particularly desirable not to have to change the design of the base vehicle 10A, such as by moving the engine block 32, because any such change to the underlying engineering of the vehicle is likely to require a complete re-design of the whole vehicle, which is an extremely expensive and time consuming process.

The structure 42 is preferably in the form of a protection bar similar in appearance to components previously known as nudge bars, roo bars, bull bars or the like. The structure 42 may be formed from an injection moulded core, similar to that described below, and may wrap around the front of the vehicle, to mimic the appearance of a conventional protection bar.

Figure 5:
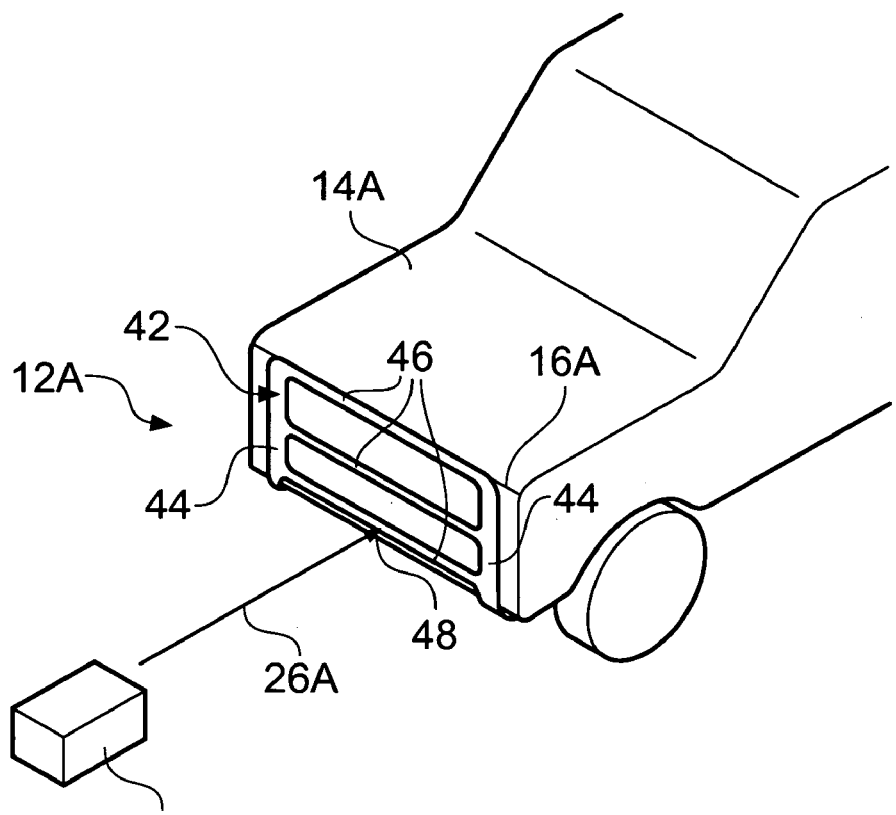
FIGS. 5, 6 and 7 are schematic front perspective views of a vehicle protected in accordance with the invention, undergoing alternative safety testing.
Figure 6:
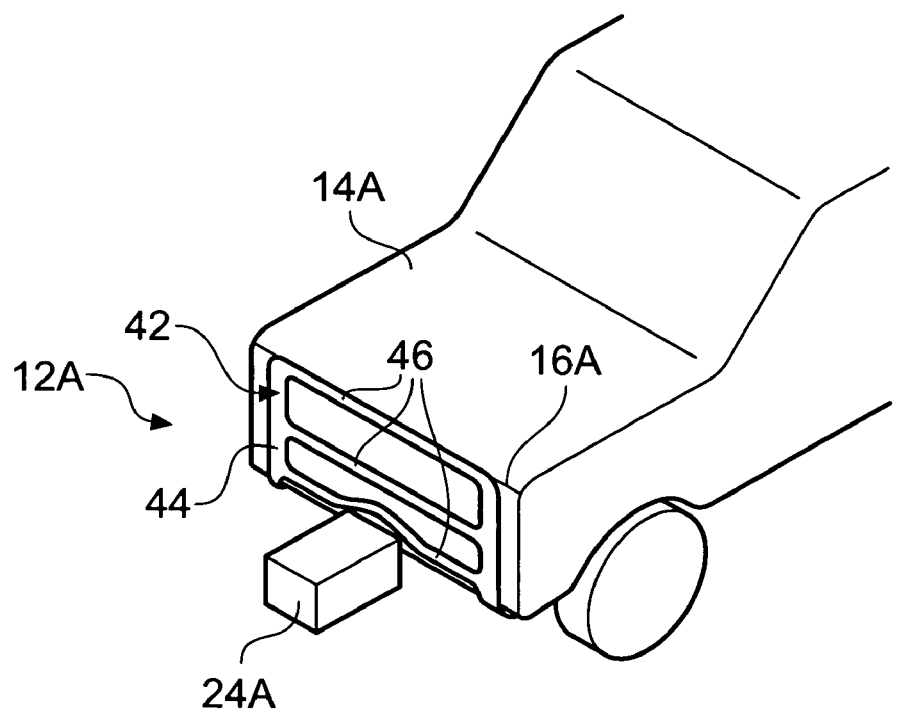
Figure 7:
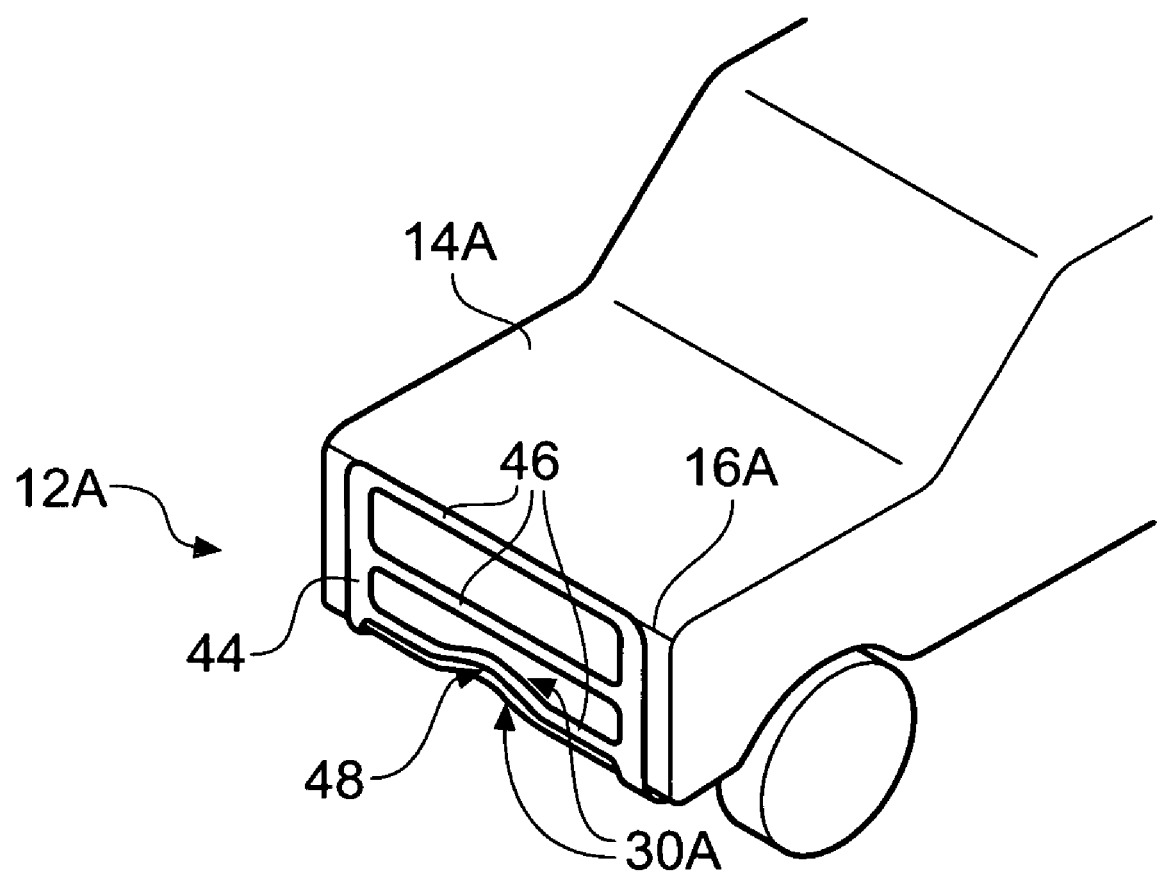

FIGS. 5, 6 and 7 illustrate the manner in which the vehicle 10A responds to the impact defined by a leg impact block 24A and the path 26A.

In this example, the structure 42 has uprights 44 at either side of the vehicle 10A, and three cross bars 46. The impact defined by the block 24 and path 26 is aimed at the lowest cross bar 46, near its centre. Thus, the initial impact is at the position 48, causing the bar 46 to bend as shown in FIG. 6. At this stage, initial partial absorption of the pre-defined impact is occurring by deflection of the bars 46, prior to them deflecting sufficiently to reach the bonnet 14A. However, in due course, the deflecting cross bar 46 will reach the bonnet 14A, so that the impact is then applied to the vehicle structure and the crumple region 30A begins to provide further impact absorption. Again, it is to be noted that because initial impact absorption has already occurred by deflection of the cross bar 46, the absorption required by the bonnet 14A is lower than in the situation illustrated in FIG. 1. Consequently, a greater pre-defined impact can be absorbed by the arrangement of the invention, without requiring the crumple region 30A to be larger than can be accommodated by the vehicle design without the structure 42.

FIGS. 8 to 12 illustrate a further example, in more detail. Again, many features correspond with features shown in FIGS. 1 to 7 and are thus given the same reference numerals, with the suffix B.

Figure 8:
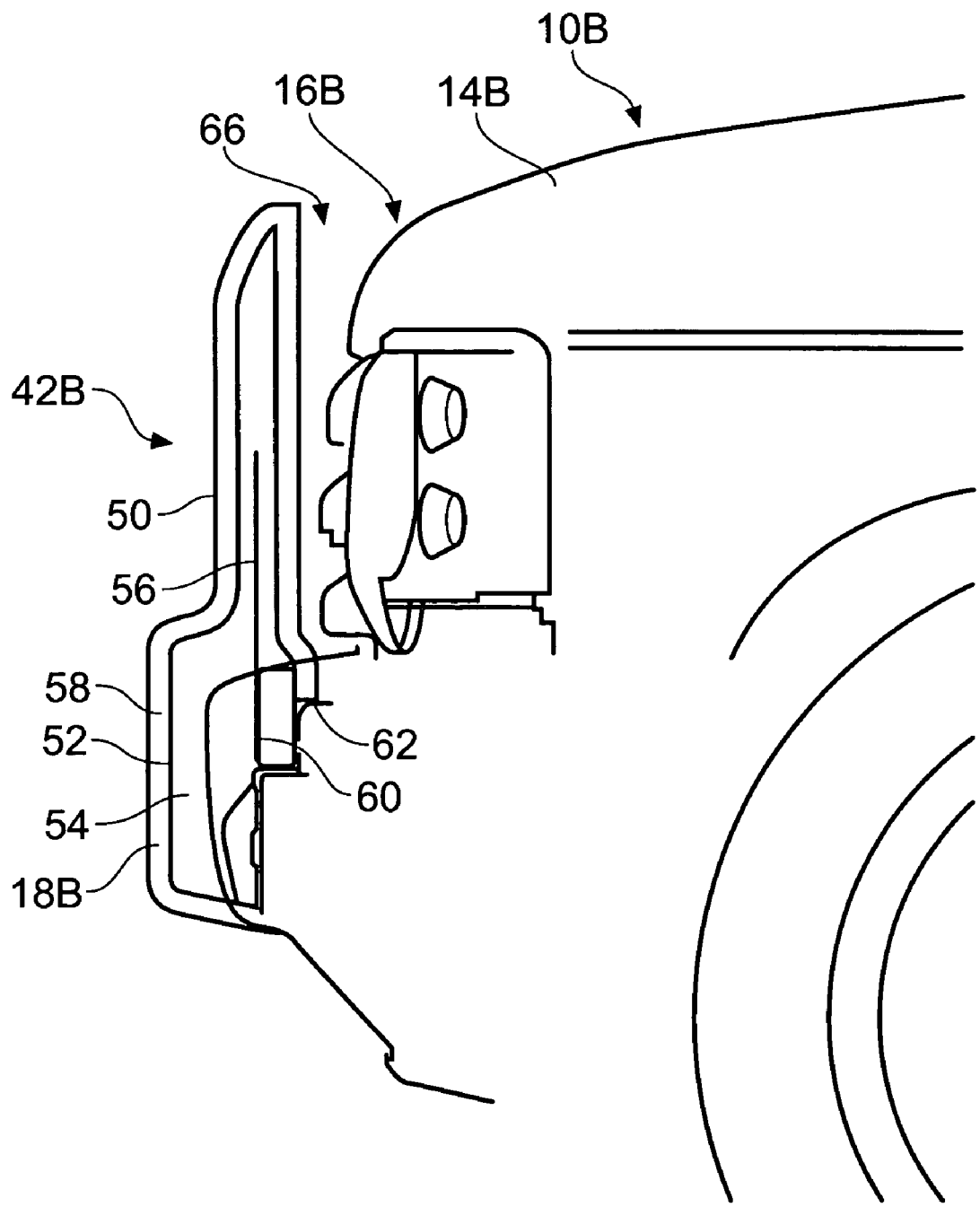
FIG. 8 is an elevation, partly in section and partly schematic, showing a pedestrian protection device of the invention, mounted on the front of a vehicle.

In FIG. 8, the vehicle 10B carries an additional impact absorbing structure 42B. The additional structure 42B is in the form of a bumper region 18B and an upward extension 50. The bumper 18B and the upward extension 50 are preferably formed integrally, so that the structure 42B can be mounted on the vehicle 10B by means of the conventional bumper mountings, as will be described. The upward extension 50 then stands up in front of the bonnet 14B, to the level of the bonnet leading edge 16B. As before, the additional structure 42B is constructed in a manner which allows it to deform, to absorb energy and impact, as will be described.

Figure 9:
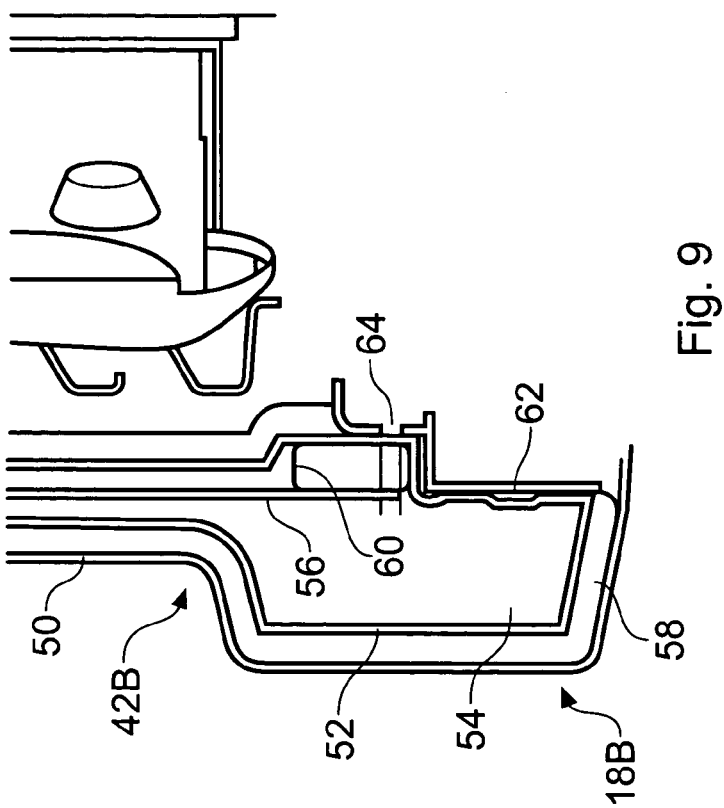
FIG. 9 shows the lower part of the device of FIG. 8, on an enlarged scale
Figure 10:
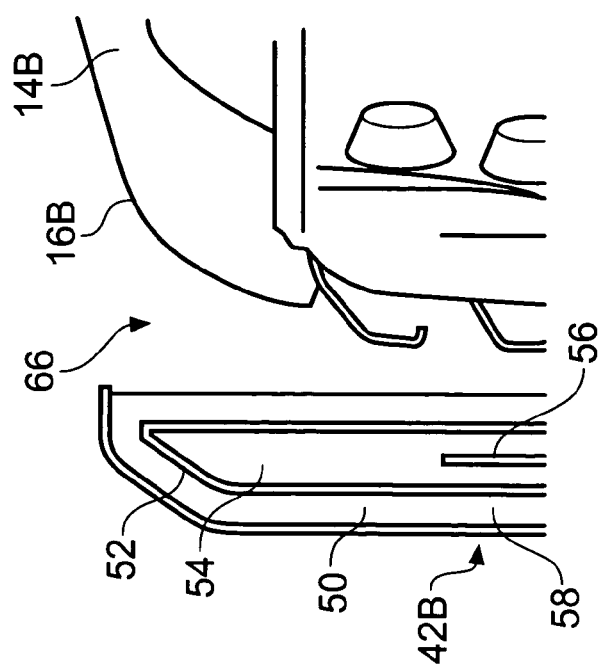
FIG. 10 shows the upper extremity of the device of FIG. 8, on an enlarged scale.

FIG. 8 shows a vertical section through the structure 42B, which is also shown partly in section in FIGS. 9 and 10, on an enlarged scale. The structure 42B has a core 52 which may be formed, for example, as a rotational or injection moulded component such as described in our previous patent applications noted above. The core 52 is filled with energy absorbing foam 54 and may also incorporate metal reinforcements 56. The core 52 is covered with an outer layer 58, primarily for cosmetic reasons. The outer layer may also be resilient, such as a foam material, preferably a self-skinning foam.

Figure 9A:
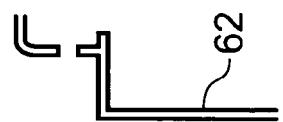
FIG. 9A shows the bumper armature of the vehicle, in isolation.

The reinforcements 56 within the structure 42B are preferably located to provide mountings for the structure 42B, as can best be seen from FIGS. 9 and 9A. The reinforcements 56 include a hollow box section 60 extending laterally across the vehicle 10B. When the structure 42B is in position, the box section 60 is close to the bumper armature 62 of the vehicle 10B, separated from it only by the material of the core 52. The armature 62 is shown in isolation in FIG. 9A. The armature has a fixing aperture 64 through which a fixing such as a bolt, extends through the core 52 to engage the box section 60 in order to mount the structure 42B to the vehicle 10B.

Figure 11:
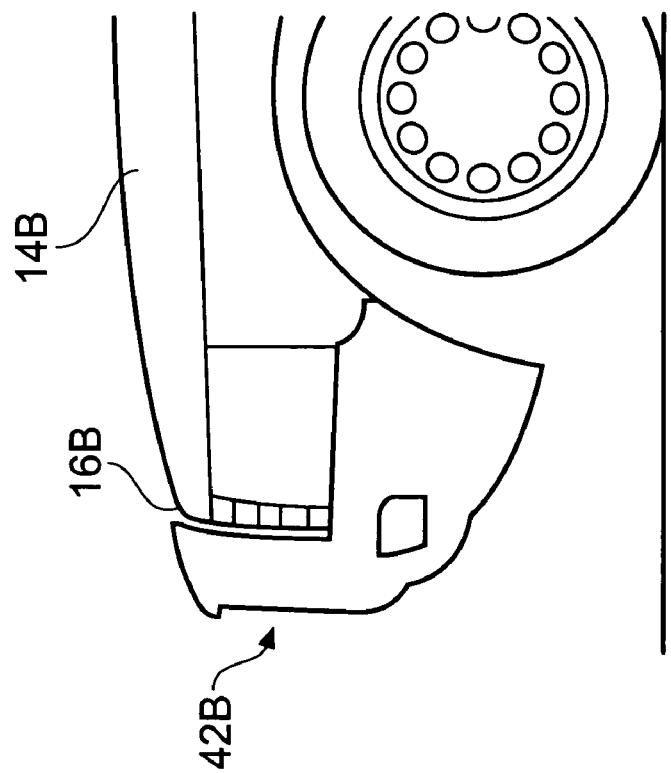
FIG. 11 is a front elevation of the vehicle and protection device.

With the structure 42B mounted in this way, the upward extension 50 reaches the height of the leading edge 16B, but a space 66 remains behind the extension 50, between the extension 50 and the bonnet 14B. The significance of this can be seen with reference to FIGS. 11 and 12. FIG. 11 illustrates the additional structure 42B in position on the vehicle 10B. As can be seen, the overall appearance closely resembles that of a conventional vehicle to which a nudge bar, or the like, has been fitted.

Figure 12:
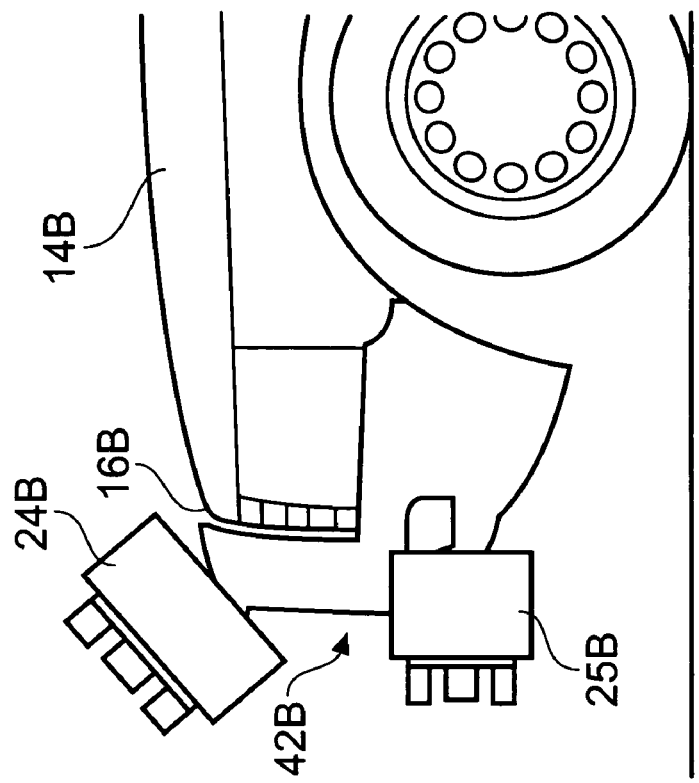
FIG. 12 shows the protection device and vehicle under test.

FIG. 12 shows the test procedure in which impact blocks 24B, 25B are directed at the vehicle 10B. In this example, block 24B is directed toward the bonnet leading edge 16B. Thus, the block 24B impacts the structure 42B near its upper extremity. This causes the initial impact to be partially absorbed by the structure 42B, by a combination of compression of the inner foam 54 and outer layer 58, and deflection of the core 52 and reinforcements 56. The precise manner of performance will depend on the choice of materials, shapes and dimensions of the various components. Some deflection of the structure 42B, into the space 66, is possible before the leading edge 16B is encountered. Further impact absorption then takes place by crumpling of the bonnet 14B, as has been described above.

However, it will again readily be understood that initial partial absorption of the defined impact from the block 24B is provided by the structure 42B and thus, the bonnet 14B is required to crumple only sufficiently to absorb the remaining energy, i.e. less than would be required to absorb the entirety of the defined impact, in the absence of the structure 42B. Consequently, the crumple region required behind the leading edge 16B will be smaller than the crumple region 28 of FIG. 1, for the same pre-defined impact to be absorbed.

Again, as noted above, the additional structure 42B is selected or designed so that the aggregate of the impact absorption provided, in use, by the additional structure 42B, and the absorption provided by the vehicle structure (in this case the bonnet 14B), is at least sufficient to absorb the pre-defined impact. The advantages of this have been explained above.

In an alternative test impact, from the block 25B, to the bumper 18B, initial partial absorption of the pre-defined impact again takes place within the additional structure 42B. In this case, the bumper 18B will be deformed in order to absorb energy, prior to any crumpling being required in the vehicle 10B, behind the bumper 18B. Thus, the crumple region behind the bumper 18B is only required to crumple sufficiently to absorb the energy remaining after the intervention of the bumper 18B and consequently, will be smaller than the crumple region 30 of FIG. 1, for the same defined impact to be absorbed. Again, the bumper 18B of the additional structure 42B is selected or designed so that the aggregate of the impact absorption provided, in use, by the bumper 18B, and the absorption provided by the vehicle structure behind the bumper 18B, is at least sufficient to absorb the pre-defined impact from the block 25B.

It can thus be seen that in each of the examples, neither the additional structure 42, 42B nor the base vehicle 10A, 10B is required to be sufficient, alone, to absorb the pre-defined impacts. For example, in the absence of the additional structure 42, 42B, the required size of the crumple regions may be too large to be accommodated in the vehicle design 10A, 10B without substantial modification being required. Conversely, the additional structures 42, 42B could not absorb the whole of the impact before encountering the bonnet 14A, 14B, unless the structure 42, 42B was sufficiently non-resilient that the safety tests would be failed in other respects, such as by absorbing the impact over too short a distance. However, in both examples, the aggregate of the initial impact provided by the additional structure 42, 42B, and the further absorption provided by the vehicle 10A, 10B, is sufficient to absorb the pre-defined impact, or more.

It will be readily understood that the impacts defined by various different safety tests are likely to differ at different positions. Consequently, it is preferred that the structure 42, 42B is selected or constructed to provide different impact response at different positions. For example, the region impacted by the upper leg block 24, 25B may be relatively inflexible, whereas the region impacted by the ball 20 or the block 24B may be much more easily deflected. This differential response can be provided within the structure 42, 42B by appropriate modification of dimensions, materials or the like.

The additional structure may be a plastic structure, particularly a plastic composite structure, or may incorporate metal components. The structure may be formed generally in the manner described in the applicant's earlier patents mentioned above.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A method of providing pedestrian protection for a selected road vehicle, by:
    (a) identifying a pre-defined impact absorption performance standard applicable to the selected vehicle;
    (b) determining the ability of the vehicle structure to absorb part of an impact pre-defined by the performance standard;
    (c) providing an additional impact absorbing structure for mounting on the vehicle to provide at least partial absorption of the pre-defined impact prior to impact on the structure of the selected vehicle;
    (d) determining the ability of the additional structure to absorb part of the impact pre-defined by the performance standard;
    (e) determining the aggregate impact absorption ability of the vehicle and the additional structure in combination;
    (f) selecting or designing the additional structure to cause the aggregate ability to be at least sufficient to absorb the pre-defined impact in accordance with the pre-defined standard; and
    (g) mounting the additional structure on the vehicle to stand up in front of the vehicle, to define a space remaining between the additional structure and the vehicle,
    wherein the aforesaid steps are practiced such that said absorption of the predefined impact is by means of initial partial absorption by the additional structure and by deflection of said additional structure into said space between the additional structure and the vehicle, and by further absorption by the vehicle.

2. A method according to claim 1, wherein the pre-defined impact is from the front of the vehicle.

3. A method according to claim 1, wherein the pre-defined impact is a simulated impact of a child or adult head or of an upper leg.

4. A method according to claim 1, wherein the pre-defined impact is a simulated leg impact.

5. A method according to claim 1, wherein the additional structure is a bumper.

6. A method according to claim 5, wherein the additional structure further incorporates an upward extension from the bumper, in front of the vehicle.

7. A method according to claim 1, wherein the additional structure provides, in use, initial and at least partial absorption at respective positions of respective pre-defined impacts, and is so selected or designed that the aggregate of the impact absorption of the said positions and of the said vehicle structure is at least sufficient to absorb either of the pre-defined impacts.

8. A pedestrian protection arrangement for use with a selected road vehicle which has a structure having an ability, in use, to provide at least partial absorption of an impact pre-defined by a performance standard, the arrangement comprising an additional impact absorbing structure mounted, in use, on the vehicle to provide initial and at least partial absorption of the pre-defined impact prior to impact on the said vehicle structure, and in which the aggregate of the impact absorption provided, in use, by the additional structure and by the said vehicle structure is at least sufficient to absorb the pre-defined impact,
    wherein the additional structure is mounted on the vehicle, and
    wherein the additional structure is mounted to stand up in front of the vehicle and defines a space remaining between the additional structure and the vehicle, such that said absorption of the predefined impact is by means of initial partial absorption by the additional structure and by deflection of said additional structure into said space between the additional structure and the vehicle, and by further absorption by the vehicle.

9. An arrangement according to claim 8, wherein the pre-defined impact is from the front of the vehicle.

10. An arrangement according to claim 8, wherein the pre-defined impact is a simulated impact of a child or adult head or of an upper leg.

11. An arrangement according to claim 8, wherein the pre-defined impact is a simulated leg impact.

12. An arrangement according to claim 8, wherein the additional structure is a bumper.

13. An arrangement according to claim 12, wherein the additional structure further incorporates an upward extension from the bumper, in front of the vehicle.

14. An arrangement according to claim 8, wherein the additional structure provides, in use, initial and at least partial absorption at respective positions of respective pre-defined impacts, and is so selected or designed that the aggregate of the impact absorption of the said positions and of the said vehicle structure is at least sufficient to absorb either of the pre-defined impacts.

15. A method of providing pedestrian protection for a selected road vehicle, by:
  (a) identifying a pre-defined impact absorption performance standard applicable to the selected vehicle;
  (b) assessing the ability of the vehicle structure to absorb part of a pre-defined impact, the impact being pre-defined by the performance standard;
  (c) selecting or designing an additional structure for mounting on the vehicle to provide at least partial, initial absorption of the pre-defined impact prior to impact on the selected vehicle and to cause the aggregate impact absorption performance of the vehicle and the additional structure to be at least sufficient to absorb the pre-defined impact in accordance with the pre-defined standard; and
  (d) mounting the additional structure on the vehicle to stand up in front of the vehicle and to define a space remaining between the additional structure and the vehicle, wherein the mounting step is practiced such that said absorption of the predefined impact is by means of initial partial absorption by the additional structure and by deflection of said additional structure into said space between the additional structure and the vehicle, and by flirt her absorption by the vehicle.

16. A method of providing pedestrian protection for a selected road vehicle, by:
  (a) identifying a pre-defined impact absorption performance standard applicable to the selected vehicle; the standard defining a standard test impact by reference to parameters which include at least one of the shape, size, mass and impact angle of a test impact body, and the standard defining at least one standard response by reference to at least one of a maximum allowable deceleration or reaction force, or maximum or minimum length over which the standard test impact must be absorbed;
  (b) identifying the response of the vehicle to the standard test impact, including identifying any standard response which cannot be met;
  (c) and providing an additional structure to provide at least partial initial absorption of the test impact prior to impact on the selected vehicle and sufficient to cause the aggregate absorption of the standard test impact by the vehicle and the additional structure together to meet the standard response; and
  (d) mounting the additional structure on the vehicle to stand up in front of the vehicle and to define a space remaining between the additional structure and the vehicle, wherein the mounting step is practiced such that said absorption of the predefined impact is by means of initial partial absorption by the additional structure and by deflection of said additional structure into said space between the additional structure and the vehicle, and by further absorption by the vehicle.

* * * * *